United States Patent
Kurian et al.

(10) Patent No.: US 9,124,426 B2
(45) Date of Patent: Sep. 1, 2015

(54) HYBRID ARQ SYSTEM WITH A SNAPSHOT FEEDBACK MECHANISM FOR INTERFERENCE PRONE WIRELESS NETWORKS

(71) Applicant: XG TECHNOLOGY, INC., Sarasota, FL (US)

(72) Inventors: Jinu Kurian, Sunrise, FL (US); Sreekant Nair, Plantation, FL (US); Neeraj Poddar, Plantation, FL (US)

(73) Assignee: XG TECHNOLOGY, INC., Sarasota, FL (US)

(*) Notice: Subject to any disclaimer, the term of this patent is extended or adjusted under 35 U.S.C. 154(b) by 58 days.

(21) Appl. No.: 14/106,939

(22) Filed: Dec. 16, 2013

(65) Prior Publication Data
US 2014/0177445 A1 Jun. 26, 2014

Related U.S. Application Data

(60) Provisional application No. 61/740,654, filed on Dec. 21, 2012.

(51) Int. Cl.
*H04L 1/18* (2006.01)
*H04L 1/16* (2006.01)

(52) U.S. Cl.
CPC ............ *H04L 1/1832* (2013.01); *H04L 1/1864* (2013.01); *H04L 1/1614* (2013.01)

(58) Field of Classification Search
None
See application file for complete search history.

(56) References Cited

U.S. PATENT DOCUMENTS

| | | | | |
|---|---|---|---|---|
| 2002/0110137 A1* | 8/2002 | Nie | ................................. | 370/429 |
| 2002/0145985 A1* | 10/2002 | Love et al. | ..................... | 370/328 |
| 2002/0159385 A1* | 10/2002 | Susnow et al. | ................ | 370/229 |
| 2007/0274218 A1* | 11/2007 | Swenson et al. | ............... | 370/235 |
| 2009/0185528 A1* | 7/2009 | Sambhwani et al. | ......... | 370/329 |
| 2009/0319851 A1* | 12/2009 | Li | ................................. | 714/749 |
| 2012/0057467 A1* | 3/2012 | Yoshida et al. | ............... | 370/238 |

* cited by examiner

*Primary Examiner* — Jenee Williams
(74) *Attorney, Agent, or Firm* — Dennis L. Cook, Esq.

(57) ABSTRACT

An IP packet transmission system is disclosed and more specifically it is a system using a hybrid ARQ method including a sliding purge window and having the transmitter opportunistically piggy-back a snapshot of the transmitter's transmit/send window in data frames. When the receiver receives this snapshot the receiver can compare it with its receive window and if a mismatch is detected, whereby the transmitter has moved on to the next packet, the receiver can now also sync up quicker and not wait for the regular timeout to progress ahead.

2 Claims, 2 Drawing Sheets

HYBRID ARQ SYSTEM WITH A SNAPSHOT FEEDBACK MECHANISM FOR INTERFERENCE PRONE WIRELESS NETWORKS

CROSS-REFERENCE TO RELATED APPLICATION

The present application claims the benefit of previously filed Provisional Patent Application, Ser. No. 61/740,654 filed Dec. 21, 2012.

FIELD OF THE INVENTION

This disclosure describes an IP packet transmission system, and more specifically is a system using a hybrid Automatic Repeat Request (ARQ) method that includes having the transmitter opportunistically piggy-back a snapshot of the transmit/send window in data frames such that when the receiver receives this snapshot the receiver can compare it with its receive window and if a mismatch is detected, whereby the transmitter has moved on to the next packet, the receiver can now also sync up quicker and not wait for the regular timeout to progress ahead.

BACKGROUND OF THE INVENTION

Impairments in wireless channels can cause bit errors that result in packet losses and adversely impact TCP throughput. Presence of interference (both in band and out of band) adds to the problem because it results in a higher error rate and diminished throughput. In such environments, intelligent schemes are required at several layers to mitigate the negative effects of these losses. ARQ mechanisms are widely used in wireless communication networks as a method to alleviate these issues, ensure data integrity, improve reliability, and to some extent guarantee in-order delivery of packets at the receiver.

When implemented at the link layer, in conjunction with Fragmentation and Re-assembly techniques, along with a sliding window approach as disclosed in US Provisional Application Ser. No. 61/735,264, "Hybrid ARQ System Using A Sliding Purge Window For Wireless Networks" filed Dec. 10, 2012 and incorporated herein, the transmitter usually can send multiple IP packets that are fragmented into several media access control (MAC) layer fragments. These fragments can be sent out of order and are then re-assembled at the receiver. This reassembly requires a MAC layer fragment identifier and sequence number. When the wireless channel degrades, as in a deep fade, the losses can continue for extended periods of time and within a second the receiver and transmitter can get out of sync because the acknowledgment messages (ACKs) are lost. What is proposed in this disclosure is a novel scheme to alleviate this problem by having the transmitter opportunistically piggy-back a snapshot of the transmitter's transmit/send window in data frames. When the receiver receives this snapshot the receiver can compare it with its receive window and if a mismatch is detected, whereby the transmitter has moved on to the next packet, the receiver can now also sync up quicker and not wait for the regular timeout to progress ahead.

BRIEF SUMMARY OF THE INVENTION

This invention describes an IP packet transmission system, and more specifically is a system using a hybrid ARQ method including a sliding purge window and having the transmitter opportunistically piggy-back a snapshot of the transmitter's transmit/send window in data frames. When the receiver receives this snapshot the receiver can compare it with its receive window and if a mismatch is detected, whereby the transmitter has moved on to the next packet, the receiver can now also sync up quicker and not wait for the regular timeout to progress ahead.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
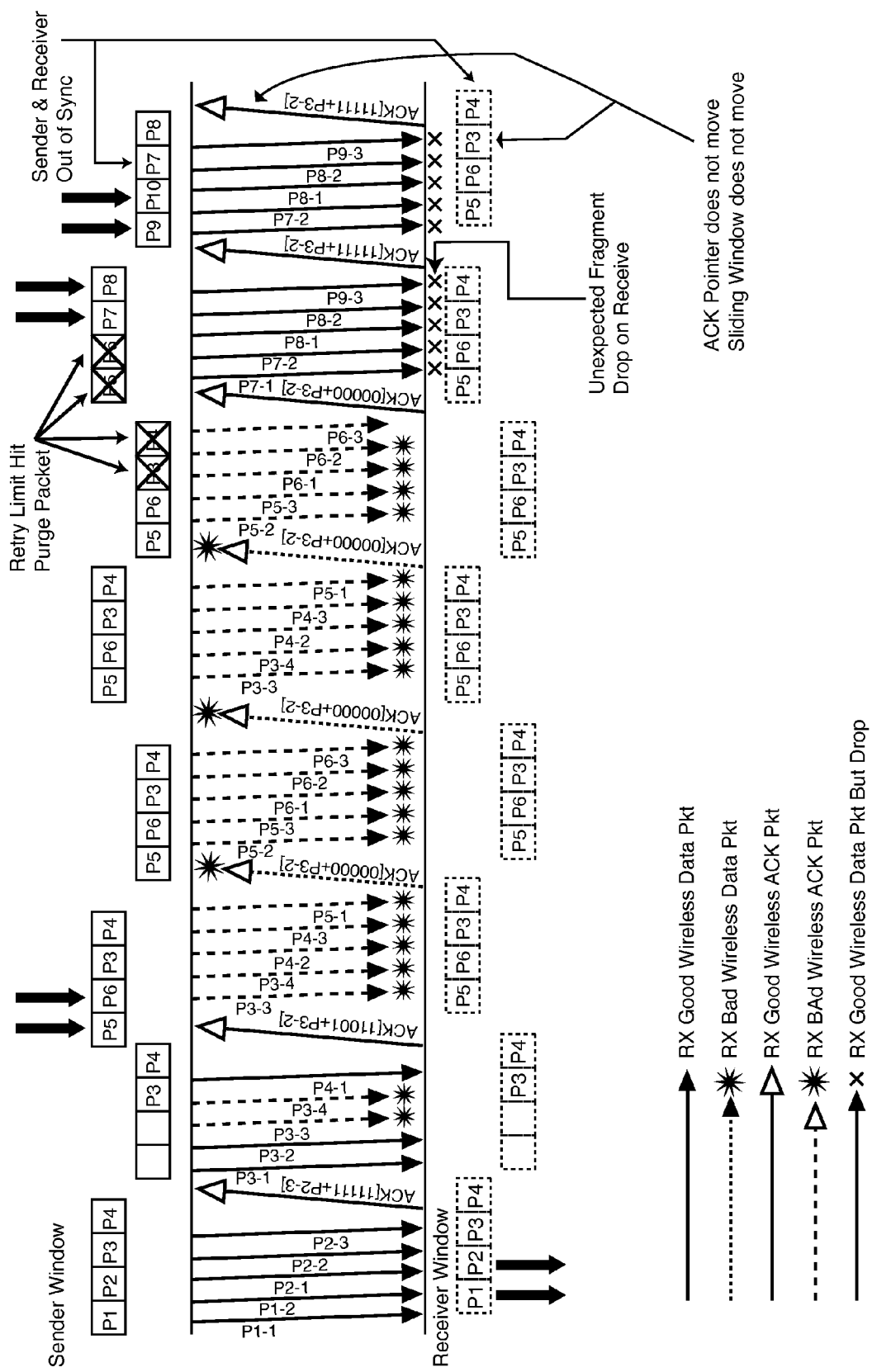
FIG. 1 is a diagram showing loss of synchronization between transmitter and receiver, and, FIG. 2 is a table showing a snapshot mechanism.

ARQ and Hybrid ARQ schemes are implemented on almost all wireless networks because they improve conventional TCP performance. However, almost all ARQ schemes assume some degree of reliability for the acknowledgement message (ACK/NACK) that is sent by the receiver so that the transmitter can re-transmit lost packets. This is usually only applicable in ideal conditions.

In wireless environments, particularly in interference prone conditions in unlicensed and ISM bands, the uplink and downlink channels are asymmetric and each suffers from varying probabilities of loss. In some systems the uplink (Mobile Station to Base Station/Access Point) has a slightly higher probability of loss because in many cases the transmitter is battery operated and the receiver is located on a building/tower with high gain antennas thereby increasing its susceptibility to interference. In such cases a loss of the uplink ACK is more detrimental because nothing can be assumed about the success of the downlink data packets. Therefore most schemes when implemented usually show a degraded performance because the assumption that the ACK/NACK is reliable is flawed.

An improved hybrid ARQ scheme is described in this disclosure that works in conjunction with Fragmentation and Re-assembly. Therefore a single IP packet from the higher layer can be divided into smaller individual fragments. These fragments are re-assembled at the receiver and forwarded to the destination as the original IP packet. Such fragments are identified with a packet id and sequence number and treated as normal IP packets are at higher layers. When the wireless channel is subjected to extended periods of deep fades/losses, the transmitter and receiver can quickly get out of sync with respect to the packets being sent and what is expected. This invention disclosure proposes a novel technique that allows the ARQ receive window state at the receiver to rapidly re-synchronize with the transmitter. This technique is generic and can be implemented in any network. We describe one embodiment of this as implemented in xMax Networks. Several other embodiments can also be made using the same concept.

Normally each IP packet can be sub-divided into several MAC layer packet data units (PDUs) depending on the amount of bandwidth assigned and the transmitter may send frames belonging to different IP packets within the same super-frame. Therefore one MAC PDU may contain payload data of one IP packet while the next may contain data of another IP packet. Therefore the receiver needs to know a 'priori' to which IP packet the arriving data belongs. This is achieved with a MAC layer Packet ID. To minimize MAC overhead a 4 bit Packet ID is used. Therefore this can wrap around after 16 outstanding IP packets. The assumption here is that as packets are read from the queue they assigned packet IDs in a monotonically increasing order. Therefore the receiver should only expect the same packet ID if it has wrapped around and all subsequent packets have been sent. Also the sequence number denotes the relative offset of the bytes within the same IP packet (same MAC level packet ID). This allows the receiver to re-assemble the entire IP packet correctly by placing the arriving data at the right offset from the start.

When ARQ is implemented using a Sliding Window in conjunction with Fragmentation and Re-assembly, the transmitter and receiver maintain their respective windows for packets in transmission. The transmitter maintains a list of outstanding packets in the Transmission Window while the receiver maintains its own Receive Window where fragments are copied as received and finally forwarded to the next hop once all data bytes have been re-assembled. This disclosure describes a typical case where there can be a max of 4 IP packets in the Sliding Window. The method employs a selective ACK approach where received bytes/fragments are acknowledged as they are successfully received.

The access point (AP) is the master of resource allocation in both directions. In the uplink direction, mobile station (MS) to AP, a request-grant mechanism is employed to reserve bandwidth. Therefore whenever the MS has data to send it sends a request for bandwidth and also provides an indication of the Packet ID (P1) and size. The receiver side ARQ state machine now is ready to receive Packet ID P1 and allocates the necessary buffers. The receiver ARQ can hold the same number of packets in transition therefore it can accept up to a max of P1+(window size−1).

Whenever the receiver receives the last burst from a MS within a super-frame an explicit ACK packet is formulated. This ACK contains a bitmap of all successfully received bursts and also the last successfully received in-order packet ID and sequence number. When the transmitter receives this ACK, it goes back and re-transmits the lost fragments and, if assigned bandwidth remains, it sends the next set of pending data bytes.

Because this is an intelligent HARQ, which accounts for the possibility of lost ACKs, the transmitter continues to send data until the Transmission Window limit is reached. At this point the transmitter goes back to the last successfully received ACK point (in the worst case—to the start of the window) and re-transmits all the unacknowledged data. This process repeats until the retransmit limit is reached. At this point the packet has been retransmitted to the limit of the system and is dropped. The next packet is then serviced from the queue and this process repeats.

There can be instances where the bandwidth assigned to a particular user is under-utilized. These situations can happen when the resource allocation block assigns a subset of the requested bandwidth and it is not possible to fit the data fragments along the respective boundaries. The reverse may also happen where the requested bandwidth is less than the minimum block that can be assigned. In such cases, the transmitter will populate the bandwidth with dummy data bytes/fragments.

What is now described is the impact of losses or errors in the channel and how this can impact the state machine at both the transmitter and receiver. As discussed above it is clear that when there are link layer errors and the ACK is not received the transmitter can re-transmit a packet. On reaching the retry limit the transmitter will purge this packet from its Transmission Window and move on to the next available packet. If the losses continue it is possible that the transmitter will move ahead significantly as newer packets are constantly pulled from the arriving queue and in the end the packets in the Transmission Window and the expected packets in the Receiver's Window will be quite different. In a case where a large packet is followed by multiple smaller sized packets, the packet Id can increase fairly fast because the smaller packets will hit their retry limit quicker than the larger one and get purged faster. Since the transmitter continues to send fragments of packets that are not expected by the receiver, even though they are successfully received, they will be dropped as the receiver does not know how to handle these frames. This is depicted in the FIG. 1 and described in the following steps:

1. Initially the transmitter and receiver are in sync and both have packets P1, P2, P3 & P4 in their buffers.
2. Receiver successfully gets all fragments of P1 and P2. These are re-assembled and forwarded to the next hop.
3. An ACK packet that includes a bitmap of all fragments is received and the last in sequence packet & fragment is also included.
4. On receiving this ACK the transmitter purges Packets P1 and P2 from its buffer.
5. The transmitter moves the transmit pointer and continues to send the fragments of P3 and P4.
6. Two fragments are lost at the receiver. The ACK therefore has a bitmap [11001] indicating fragments P3-3 & P3-4 were lost. The sequence number shows P3-2.
7. The transmitter retransmits P3-3, P3-4 and then continues with new data of P4 onwards. Since there is free buffer available, it reads two new packets from the queue.
8. All the data fragments are lost at the receiver. The ACK bitmap indicates [00000] and in sequence packet continues as P3-2.
9. ACK is not received by the transmitter. The transmit pointer moves ahead and sends the next available packets/fragments.
10. The link continues to experience losses at both ends. After several frames, the transmitter has reached its max limit for packet P3 and P4. It purges them from its buffer. Receiver has no indication of this purge.
11. Transmitter receives ACK within sequence of P3-2. Does not know what to do with this as it does not have P3 in its buffer. Retry limit of P5 and P6 is reached. They are purged. P7 and P8 is read from queue. Transmit pointer moves ahead and now sends new fragments belonging to P7 & P8.
12. Receiver successfully receives fragments of P7 and P8 but does not expect these packet IDs. It drops them as it cannot handle it. Continues to resend ACK with P3-2.
13. Transmitter reads two more packets from queue P9 and P10. Transmitter and receiver windows are now entirely out of sync.

Unless there is a mechanism to inform the receiver that the transmitter has moved on, one can clearly see that the state machines are in a state of deadlock and the data transfer effectively stops even though the link is stable again. Receipt of a fragment with a new packet ID does serve as an indication that the transmitter has moved on to a new packet. However, this information is not enough for the receiver to definitely conclude which packet to purge. For example in step 12 above if the retry limit of only P6 is reached and P5 is still in the transmission window, there is no way for the receiver to decide between P5 & P6 when it receives fragments from P7. Therefore this disclosure describes an approach that is implemented, along with the Sliding Purge Window described in the application mentioned above, to further improve the performance of the system particularly in the presence of interference.

The earlier sections the problems encountered by ARQ schemes using a sliding window approach along with Fragmentation and Re-assembly are described. This disclosure proposes a simple method to use the unused bandwidth by sending dummy datagram packets that include a snapshot of the transmitter's Transmit Window. The actual format of the packet is implementation specific and beyond the scope of this document. For example one embodiment may be to simply include the packet identifiers of the packets that are currently present in the Transmit Window.

Figure 2:
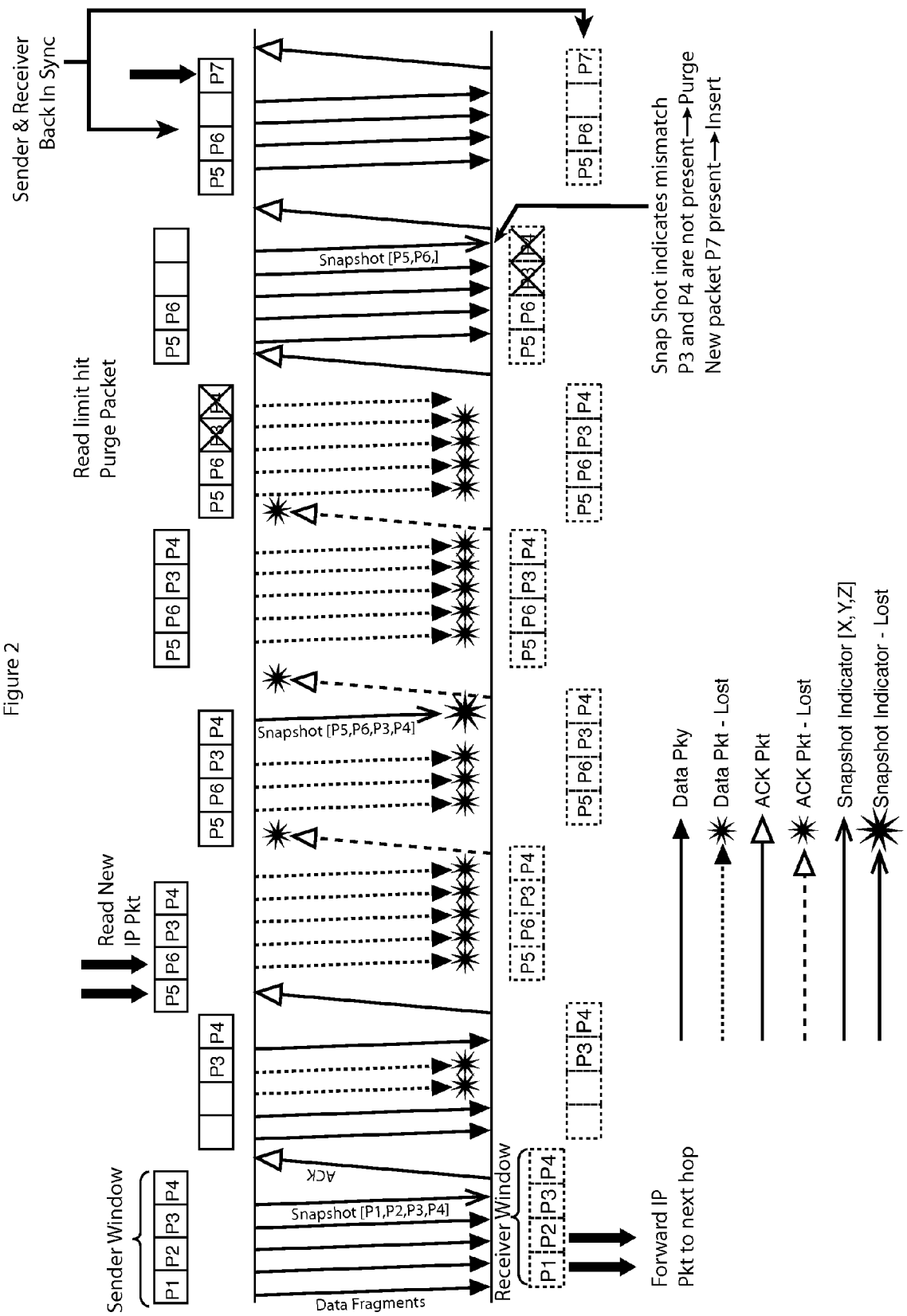

On receiving this datagram that includes the snapshot, the receiver would compare the data with its own Receive Window. If the data matches, then the transmitter and receiver are in sync and no action is performed. If the snapshot indicates a mismatch, then the stale packets in the receiver's Receive Window are purged. This allows the receiver to match the data correctly and re-assemble the packets successfully. A preferred embodiment implementation is shown in FIG. 2.

There is no pre-determined interval or moment to send this snapshot. The idea is to opportunistically send this whenever possible. If links are good this should not be required, however, occasionally the system can experience long periods of interference where the data in both directions is lost. When this happens, and whenever there is under-utilized bandwidth, rather than wasting this bandwidth the proposed solution is to send this extremely useful information so that both transmitter and receiver are in sync. If they already are in sync no bandwidth is wasted in this process. If they are not in sync then they correct themselves quicker than when using other timeout mechanisms.

This method involves the transmitter sending a datagram/traffic burst to the receiver, which is subject to losses as shown in the figures. This method is not assumed to be foolproof, but when used in conjunction with other schemes, results in better performance.

Since certain changes may be made in the above described snapshot mechanism as part of the Sliding Purge Window method without departing from the scope of the invention herein, it is intended that all matter contained in this description shall be interpreted as illustrative and not in a limiting sense.

What is claimed is:

1. A sliding purge window and snapshot feedback method to reduce packet losses and synchronization time, and improve transport control protocol throughput in a wireless network between a receiver having a receive window, fed by a fragmentation buffer and a re-assembly buffer to re-assemble fragments of packets received, and a transmitter having a transmission window and that monotonically assigns each packet sent by the transmitter with a packet ID number up to a maximum packet ID number, said wireless network using a Hybrid Automatic Repeat Request transmission scheme having a re-transmission logic that ensures an oldest unacknowledged packet is re-transmitted first wherein the sliding purge window method ensures that the packets in the receive window match the packets in the transmission window such that if there is a transmission error the Hybrid Automatic Repeat Request transmission scheme recovers and the receiver and transmitter remain in synchronization comprising:

said receiver having a sliding purge window;
setting a threshold packet number for said sliding purge window that is less than the maximum packet ID number;
said receiver purging an oldest received packet from said re-assembly buffer and fragmentation buffer each time a fragment is received by said receiver that belongs to a packet having a packet ID number that is greater than the packet ID number of a packet in the fragmentation buffer and re-assembly buffer by said threshold packet number;
said transmitter regularly storing a snapshot of the packets in the transmission window and said transmitter sending said snapshot to said receiver when transmission bandwidth allows; and,
then said receiver receiving and comparing said snapshot to packets in said sliding purge window and when the comparison shows a difference in said snapshot and said sliding purge window nonmatching packets in said sliding purge window are purged by said receiver.

2. The sliding purge window and snapshot feedback method of claim 1 further comprising:

said receiver purging an oldest received packet from said re-assembly buffer and fragmentation buffer each time a new fragment is received by said receiver that belongs to a packet having a packet ID number greater than the packet ID number of a packet in the fragmentation buffer and re-assembly buffer and a difference between the packet ID number of said new fragment and the packet ID number of said packet in the fragmentation buffer and re-assembly buffer is greater than said threshold packet number; and,
said receiver purging an oldest received packet from said re-assembly buffer and fragmentation buffer each time a new fragment is received by said receiver that belongs to a packet having a packet ID number less than the packet ID number of said packet in the fragmentation buffer and re-assembly buffer and a difference between said maximum packet ID number and the packet ID number of said packet in the fragmentation buffer and re-assembly buffer then added to the packet ID number of said new fragment is less than said threshold packet number.

* * * * *